United States Patent
Menger (10) Patent No.: US 8,590,636 B2
(45) Date of Patent: Nov. 26, 2013

(54) ROTARY STEERABLE DRILLING SYSTEM

(75) Inventor: Christian Menger, Bristol (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/380,756

(22) Filed: Apr. 28, 2006

(65) Prior Publication Data

US 2007/0251726 A1 Nov. 1, 2007

(51) Int. Cl.
*E21B 7/06* (2006.01)

(52) U.S. Cl.
USPC .............................. 175/61; 175/73

(58) Field of Classification Search
USPC ...................... 175/61, 73–75, 256
See application file for complete search history.

(56) References Cited

U.S. PATENT DOCUMENTS

| | | | |
|---|---|---|---|
| 4,394,881 A * | 7/1983 | Shirley | 175/76 |
| 4,637,479 A * | 1/1987 | Leising | 175/26 |
| 5,113,953 A | 5/1992 | Noble | |
| 5,314,032 A * | 5/1994 | Pringle et al. | 175/74 |
| 5,685,379 A | 11/1997 | Barr et al. | |
| 5,803,185 A * | 9/1998 | Barr et al. | 175/45 |
| 6,092,610 A | 7/2000 | Kosmala et al. | |
| 6,109,372 A | 8/2000 | Dorel et al. | |
| 6,158,529 A | 12/2000 | Dorel | |
| 6,244,361 B1 | 6/2001 | Comeau et al. | |
| 6,364,034 B1 | 4/2002 | Schoeffler | |
| 6,394,193 B1 | 5/2002 | Askew | |
| 6,401,842 B2 | 6/2002 | Webb et al. | |
| 7,188,685 B2 * | 3/2007 | Downton et al. | 175/61 |
| 8,011,452 B2 | 9/2011 | Downton | |
| 2001/0052428 A1 | 12/2001 | Larronde et al. | |
| 2002/0139584 A1 * | 10/2002 | Hughes et al. | 175/107 |
| 2003/0121702 A1 | 7/2003 | Downton et al. | |
| 2003/0127252 A1 * | 7/2003 | Downton et al. | 175/73 |
| 2011/0266063 A1 | 11/2011 | Downton | |
| 2012/0012396 A1 | 1/2012 | Downton | |

FOREIGN PATENT DOCUMENTS

| | | |
|---|---|---|
| EP | 0209318 | 10/1990 |
| GB | 2172324 | 9/1986 |
| GB | 2172325 | 9/1986 |
| GB | 2408526 | 10/2007 |
| GB | 2439661 | 1/2008 |

OTHER PUBLICATIONS

"Powerdrive Xtra Series," Schlumberger Brochure (Oct. 2002).
"Technology Focus on Rotary Steerable Answers," Schlumberger Oilfield Bulletin.

* cited by examiner

*Primary Examiner* — David Andrews
(74) *Attorney, Agent, or Firm* — Chadwick A. Sullivan; Brigitte Jeffery Echols (57) ABSTRACT

A rotary steerable system ("RSS") includes a drive coupling having a first section adapted for connection within a drill string and a second section adapted for supporting a drill bit. A flexible joint connects the first section to the second section for transmitting drilling loads, such as torque and weight, therebetween and permitting pivoting of the second relative to the first section. A tubular sleeve is disposed about the flexible joint and at least portions of the first section and the second section. The tubular sleeve is connected to the second section for movement therewith and is sized to permit pivoting movement of the tubular sleeve relative to the portion of the first section disposed therein. At least three actuators are carried by the portion of the drive coupling's first section that is disposed within the tubular sleeve for applying a pivoting force to an inner surface of the tubular sleeve when activated.

35 Claims, 8 Drawing Sheets

ROTARY STEERABLE DRILLING SYSTEM

BACKGROUND OF THE INVENTION

1. Field of the Invention

The present invention relates to rotary steerable drilling systems, and more particularly to point-the-bit type systems.

2. The Related Art

An oil or gas well often has a subsurface section that is drilled directionally, i.e., inclined at an angle with respect to the vertical and with an inclination having a particular compass heading or azimuth. A typical procedure for drilling a directional wellbore is to remove the drill string and drill bit by which the initial, vertical section of the well was drilled using conventional rotary drilling techniques, and run in a mud motor having a bent housing at the lower end of the drill string which drives the bit in response to circulation of drilling fluid. A typical example of such a setup is Schlumberger's POWERPACK™ positive displacement steerable motor. The bent housing provides a bend angle such that the axis below the bend point, which corresponds to the rotation axis of the bit, has an inclination with respect to the vertical.

A "toolface" angle with respect to a reference, as viewed from above, is established by slowly rotating the drill string and observing the output of various orientation devices until the desired azimuth or compass heading is reached. The mud motor and drill bit are then lowered (i.e., the weight of the drill string is loaded onto the drill bit) with the drill string non-rotatable to maintain the selected toolface, and the drilling fluid pumps (a.k.a. "mud pumps") are energized to develop fluid flow through the drill string and mud motor. The mud motor converts the hydraulic energy of the drilling fluid into rotary motion of a mud motor output shaft that drives the drill bit. The presence of the bend angle causes the bit to drill on a curve until a desired borehole inclination has been established. Once the desired inclination is are achieved at the desired azimuth, the drill string is then rotated so that its rotation is superimposed over that of the mud motor output shaft, which causes the bend section to merely orbit around the axis of the borehole so that the drill bit drills straight ahead at whatever inclination and azimuth have been established.

Various problems can arise when sections of the wellbore are being drilled with a mud motor and the drill string is not rotating. The reactive torque caused by operation of a mud motor can cause the toolface to gradually change so that the borehole is not being deepened at the desired azimuth. If not corrected, the wellbore may extend to a point that is too close to another wellbore, the wellbore may miss the desired subsurface target, or the wellbore may simply be of excessive length due to "wandering." These undesirable factors can cause the drilling costs of the wellbore to be excessive and can decrease the drainage efficiency of fluid production from a subsurface formation of interest. Moreover, a non-rotating drill string will cause increased frictional drag so that there is less control over the "weight on bit" and the rate of drill bit penetration can decrease, which can also result in substantially increased drilling costs. Of course, a non-rotating drill string is also more likely to get stuck in the wellbore than a rotating one, particularly where the drill string extends through a permeable zone that causes significant build up of mud cake on the borehole wall.

Rotary steerable drilling systems minimize these risks by steering the drill string while it's being rotated. Rotary steerable systems, also known as "RSS," may be generally classified as either "push-the-bit" systems or "point-the-bit" systems. The present invention is particularly related to the latter type of RSS.

In a point-the-bit rotary steerable systems, the axis of rotation of the drill bit is continuously deviated from the local axis of the bottom hole assembly (BHA) in the general direction of the next portion of the intended (curved) wellbore. Typically, the wellbore is propagated in accordance with a three-point geometry defined by upper and lower "touch points," such as upper and lower stabilizers, and the drill bit. The angle of deviation of the drill bit axis coupled with a finite distance between the drill bit and lower touch point results in the non-collinear condition required for a curve to be generated. In its idealized form, the drill bit is not required to cut sideways because the bit axis is continually rotated in the direction of the curved hole.

There are many ways in which the non-collinear condition may be achieved, including a fixed bend at a point in the BHA close to the lower touch point or a flexure of the drill bit drive shaft distributed between the upper and lower touch points. The continuous drill bit pointing required in a point-the-bit RSS can otherwise be achieved by non-rotating eccentric stabilizer sleeves. Eccentric sleeves rely on the angular orientation of the stabilizer relative to the wellbore to be constant to ensure the bit is pointed in the required direction. If relative rotation occurs between the stabilizer and the wellbore, the tool loses its reference point and needs to be re-set.

Still other systems, with all-rotating external components, maintain a fixed offset angle between the main tool axis and the bit axis through an offset mandrel and a universal joint. Those systems rely on high-power electric motors and control electronics to hold the drill bit axis in the desired orientation relative to the formation. When drilling straight, the control motor has to ensure the drill bit axis is rotating with the main tool to achieve a neutral steering response. The fixed offset angle requires a high-power motor to overcome the side frictional forces on the drill bit. A varying offset angle can reduce the power requirement but the additional degree-of-freedom needs to be controlled by some means.

A need therefore exists for a point-the-bit RSS where dogleg performance need not be compromised at the expense of maintaining steering direction.

A need further exists for a point-the-bit RSS that is not dependent on constant angular orientation between the wellbore and a component of the RSS.

SUMMARY OF THE INVENTION

In one aspect, the present invention provides a rotary steerable system ("RSS"), including a drive coupling having a first section adapted for connection within a drill string, a second section adapted for supporting a drill bit, and a flexible joint connecting the first section to the second section for transmitting drilling loads therebetween and permitting pivoting of the second section relative to the first section. A tubular sleeve is disposed about the flexible joint and at least portions of the first section and the second section. The tubular sleeve is connected to the second section for movement therewith and is sized to permit pivoting movement of the tubular sleeve relative to the portion of the first section disposed therein. At least three actuators are carried by the portion of the drive coupling's first section that is disposed within the tubular sleeve. The actuators are spaced substantially equally apart; in the case of three actuators, the spacing is substantially 120° apart. Each of the actuators is adapted for applying a pivoting force to an inner surface of the tubular sleeve when activated. A gate is provided for delivering a force-transmitting medium to activate the actuators when the actuators are moved through a wellbore-referenced window by rotation of the drive coupling's first section with the drill string. The wellbore-referenced window is greater than the actuator spacing (e.g., greater than 120°) such that at least two of the actuators are activated within the window when the gate delivers the force-transmitting medium. Accordingly, the second section is controllably-oriented relative to the first section.

particular embodiment of the inventive RSS further includes a first strike ring carried on an inner surface of the tubular sleeve disposed about the portion of the drive coupling's first section to limit the degree of pivoting between the tubular sleeve and the first section. A second strike ring may also be carried on an outer surface of the portion of the first section disposed within the tubular sleeve, such that the second strike ring complements the first strike ring in limiting the degree of pivoting between the tubular sleeve and the first section.

In a particular embodiment, each of the actuators of the RSS is a piston, and the force-transmitting medium is a drilling fluid. In this embodiment, the gate is a rotary valve, and preferably includes a rotating element and a position control element. The rotating element includes three or more ports formed in the first section for delivering drilling fluid to the respective three or more pistons. The position control element includes a valve rotor shaped to define a body for closing the ports and a window for opening the ports. The window preferably has an opening between about 90° and about 270°, such that during rotation of the rotating element, at least two of the ports can communicate drilling fluid to their respective pistons. It is further preferred that a control unit be provided for maintaining the valve rotor in a substantially stationary position relative to the wellbore, whereby the window is wellbore-referenced.

In another embodiment, each of the actuators is electrically actuated, such as by electromechanical or electromagnetic means, in which case the force-transmitting medium is electricity. The gate of this embodiment is an electrical switch.

In a particular embodiment, the first section of the drive coupling is a tubular body, the second section is a bit shaft, and the flexible joint is a universal joint such as a Hooke's joint.

In another embodiment, the first section of the drive coupling is a first substantially rigid section of a tubular body, the second section is a second substantially rigid section of the tubular body, and the flexible joint is a substantially flexible section of the tubular body.

In another aspect, the present invention provides a method for steering a drill string while the drill string is rotating. The drill string is equipped with a drive coupling including a first section connected to a second section via a flexible joint, and a tubular sleeve disposed about the flexible joint and at least portions of the first section and the second section. The tubular sleeve is connected to the second section for movement therewith and is sized to permit pivoting movement of the tubular sleeve relative to the portion of the first section disposed therein. The method includes the steps of rotating the drill string within the wellbore, and directing a force-transmitting medium through ports in the portion of the first section disposed within the tubular sleeve to apply a pivoting force to inner surface portions of the tubular sleeve moving through a wellbore-referenced window, whereby the second section is controllably oriented relative to the first section.

In a particular embodiment of the inventive method, the wellbore-referenced window is about 180°, and the application of a pivoting force to inner surface portions of the tubular sleeve moving through the wellbore-referenced window produces a resultant pivoting force directed within a smaller wellbore-referenced window of about 90°.

The inventive method is otherwise similar to the features mentioned above and elsewhere herein for the inventive RSS.

BRIEF DESCRIPTION OF THE DRAWINGS

So that the above recited features and advantages of the present invention can be understood in detail, a more particular description of the invention, briefly summarized above, may be had by reference to the embodiments, thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
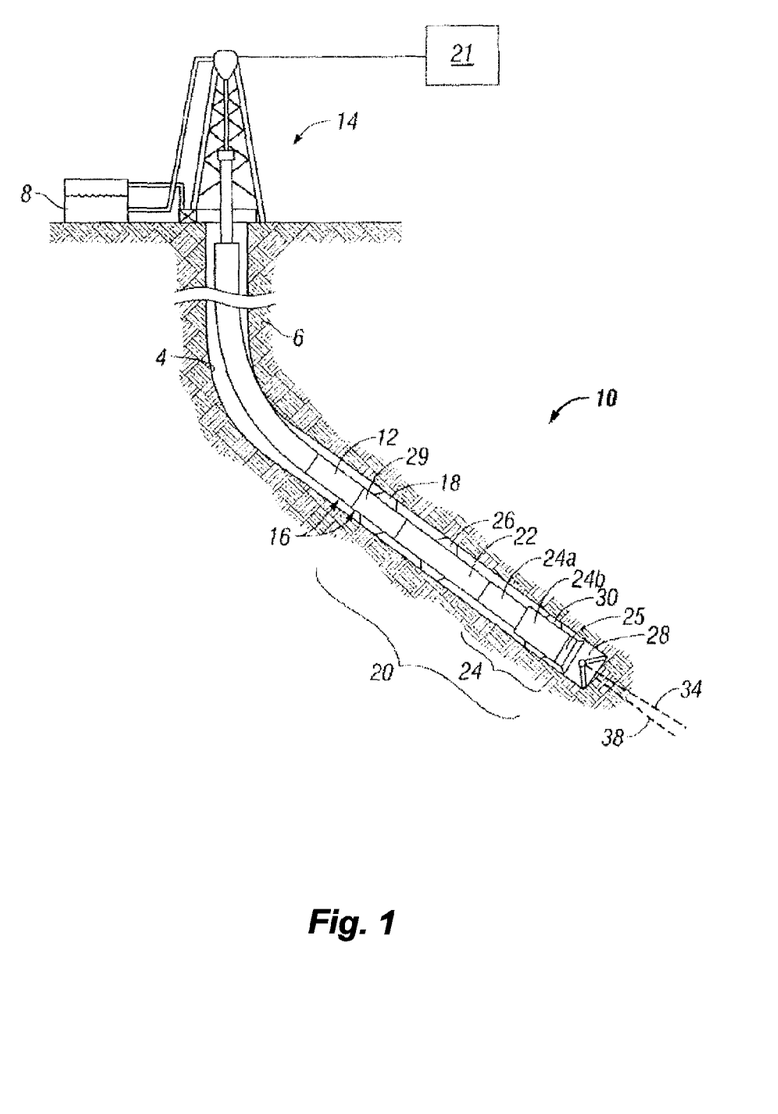
FIG. 1 is a schematic, partially in section, of a drill string being used to directionally drill a wellbore in accordance with the present invention.

FIG. 1 illustrates a directionally-drilled wellbore 4 formed through an earthen formation 6 using a suitable bottomhole assembly ("BHA"), generally indicated as 10. The BHA is typically connected within a tubular drill string 12, and defines the lower portion of the drill string. The drill string 12 is rotatably driven by a drilling rig 14 from the surface of the land, or marine platform (not shown), overlying the formation 6. In addition to providing motive force for rotating the drill string 12, the drilling rig 14 also supplies a drilling fluid 8, under pressure, through the upper and central portions of the tubular drill string 12 to the BHA 10. In order to achieve directional control while drilling, components of the BHA 10 may include one or more drill collars 16, one or more drill collar stabilizers 18, and a rotary steerable system ("RSS") 20. The RSS 20 is the lowest component of the BHA, and includes a control section 22 which typically houses the sensors, electronics, and other devices necessary for control of the rotary steerable system 20, and a steering section 24 which is the focus of the present invention. The steering section 24 includes an upper section 24a and a lower section 24b, and is connected to a drill bit 28 via a bit shaft 25. Although the present invention is described herein in terms of a two-section RSS, the invention is not so limited. For example, the sections 22, 24 may be integrally combined in one component.

The RSS control section 22 is, in a preferred embodiment, connected to the last of the drill collars 16 or to any other suitable downhole component. Other components suited for attachment of control section 22, or the RSS 20 in general, include drilling motors, drill collars, measuring while drilling tools, tubular segments, data communication and control tools, cross-over subs, etc. In the particular embodiment of FIG. 1, stabilizers are attached to one of the drill collars 16 (see reference 18), to the control section 22 (see reference 26), and to the steering section 24 (see reference 30). The present invention is not restricted, however, to any particular stabilizer configuration.

A surface control system, indicated generally at 21, is utilized to communicate steering commands to the electronics in the RSS control section 22, either directly in a manner that is well known in the art (e.g., mud-pulse telemetry) or indirectly via a measuring while drilling ("MWD") module 29 includes among the drill collars 16. The bit shaft 25 and drill bit 28 are pivoted, as represented by axis 34, relative to the axis 38 of the last drill collar 16 by way of a flexible section within the steering section 24, as described further below.

The steering section 24 is intermittently activated to actively maintain the bit axis 34 pointing in a particular direction while the entire drill string 12 is rotated at drill sting RPM. The phrase "actively tilted" is meant to differentiate the dynamic orientation of the RSS 20 from the known fixed-displacement types of RSS. "Actively tilted" means that the rotary steerable system 20 has no fixed angular offset. Rather, the angular offset varies dynamically as the rotary steerable system 20 is operated.

The steering section 24 allows the drill bit axis 34 to be tilted with respect to the axis 38 of the last drill collar 16, such that the drill bit 28 is pointed in the direction desired for the wellbore 4. In other words, the direction of the drill bit 28 defines the direction of the wellbore 4.

The inventive RSS 20 operates in such a manner that no external part of the BHA 10 need ever be stationary with respect to the wellbore while drilling is in progress. This helps to avoid hang-up on obstructions, since it is significantly easier to rotate over such obstructions while running in or out than with a straight linear pull.

The lower steering section 24b is essentially defined by various embodiments of a drive coupling, one embodiment of which will now be described with reference to FIGS. 2-6. The drive coupling 50 includes a first section 52 adapted for connection within the drill string 12, a second section 54 adapted for supporting the drill bit 28, and a flexible joint 56 connecting the first section 52 to the second section 54 for transmitting drilling loads, e.g., torque and weight, therebetween and permitting pivoting of the second section 54 relative to the first section 52.

Figure 2:
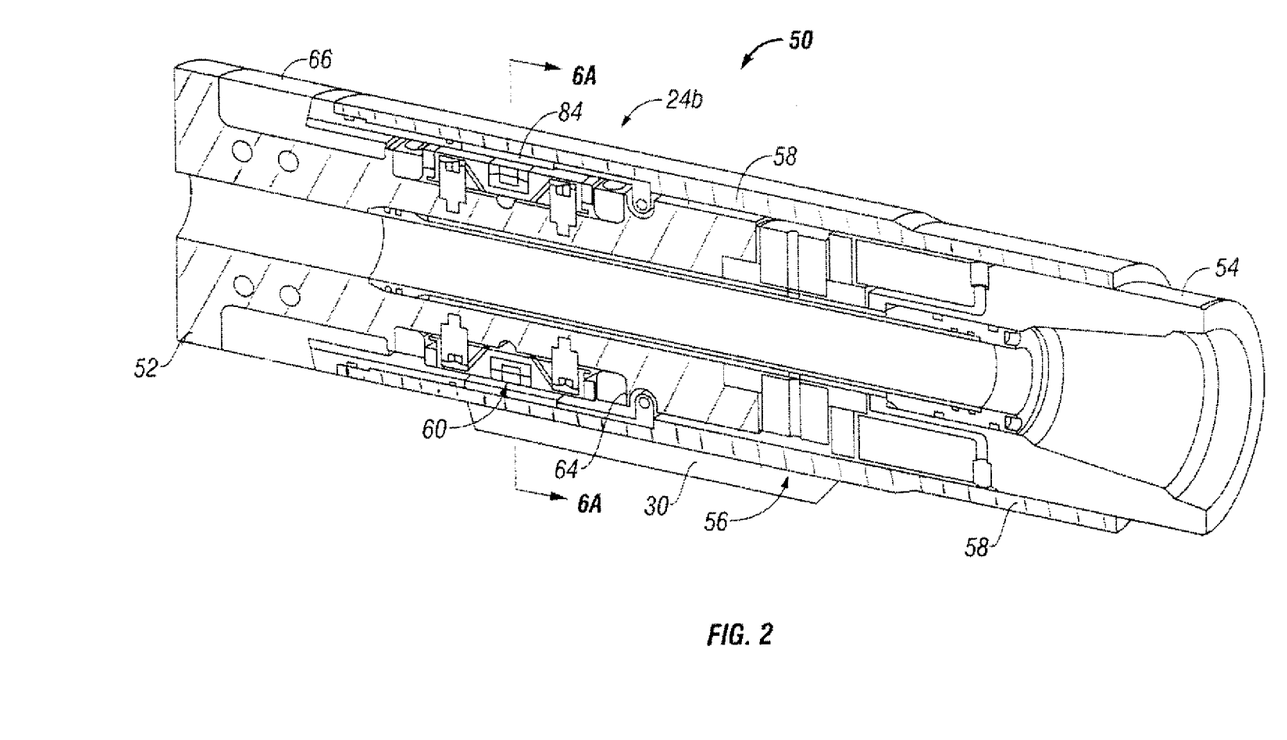
FIG. 2 is a sectional view of one embodiment of a steering section of a rotary steerable system ("RSS") in accordance with one aspect of the present invention.

The first section 52 defines a main or central shaft for the drive coupling 50, and is in one embodiment a tubular component of the RSS control section 22 that is connected to the last drill collar 16. Alternatively, the first section 52 may be a tubular body independent of the control section 22, but otherwise connected to the drill string such as via the last drill collar 16. The second section 54 is preferably a bit shaft or bit box, as are generally known in the art.

Figure 5:
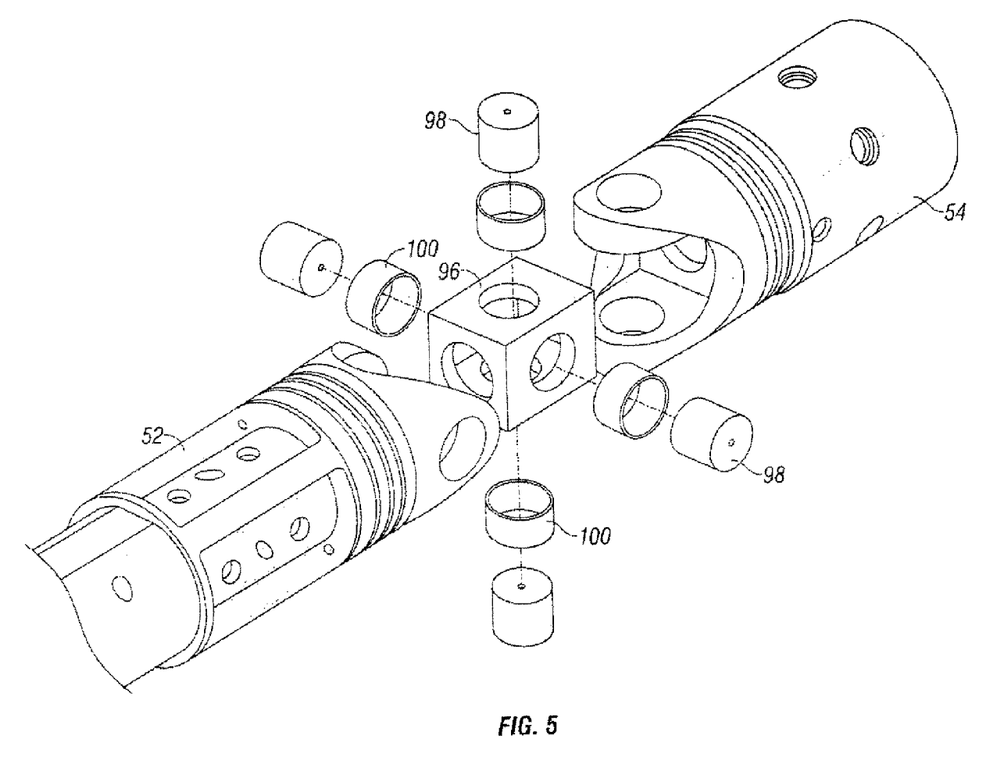
FIG. 5 is an exploded view of a universal joint employed in the steering section shown in FIG. 2.

The flexible joint 56 is preferably a universal joint, such as that shown in the exploded view of FIG. 5. The flexible joint of this embodiment thus includes a Hooke's Joint block or cross 96, and four sets of complementing Hooke's Joint pins 98 and bushings 100.

A tubular sleeve 58 is disposed about the flexible joint 56 and at least portions of the first section 52 and the second section 54. The tubular sleeve is connected to the second section 54 for movement therewith and is sized to permit pivoting movement of the tubular sleeve 56 relative to the portion of the first section 52 disposed therein. At least three actuators, which are pistons 60 (four are shown) in the embodiment of FIGS. 2-6, are carried by the portion of the drive coupling's first section 52 that is disposed within the tubular sleeve 58. The piston actuators 60 are spaced substantially 90° apart.

Figure 3:
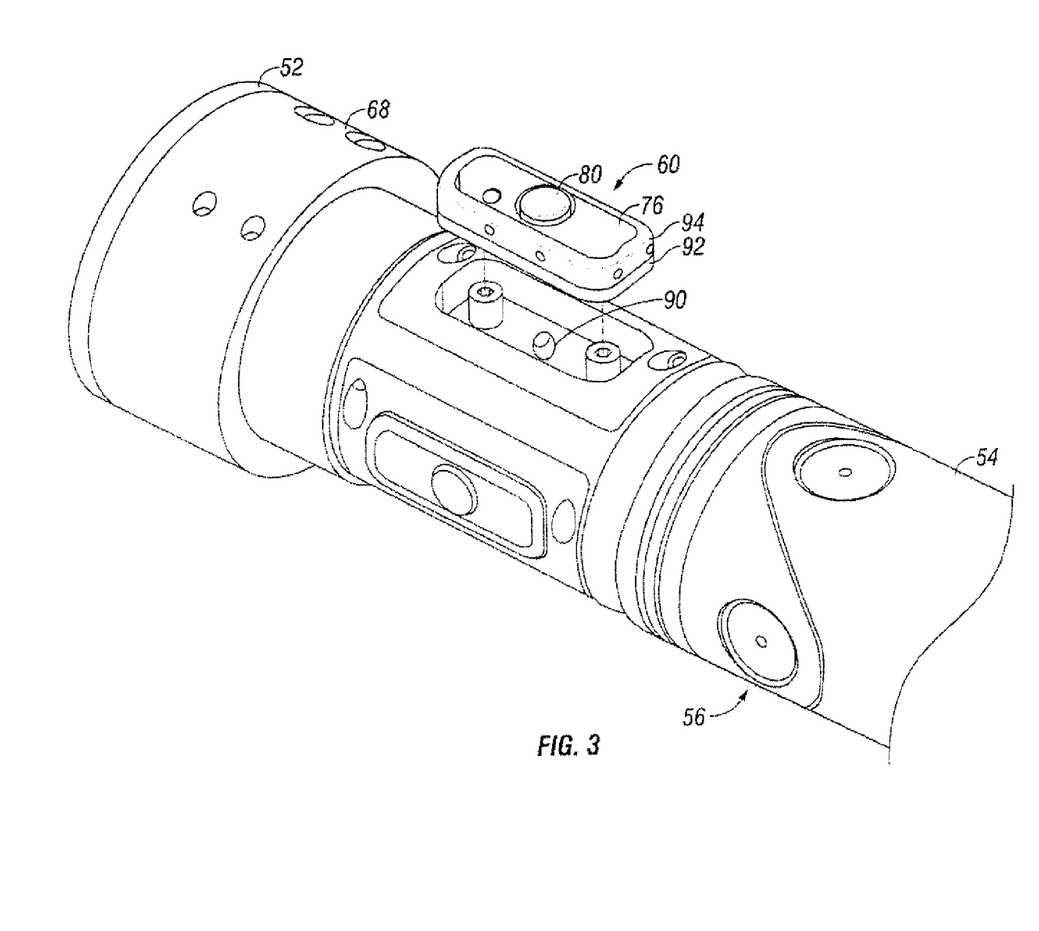
FIG. 3 is a perspective view of the steering section of FIG. 2, showing a partially disassembled piston actuator.
Figure 4:
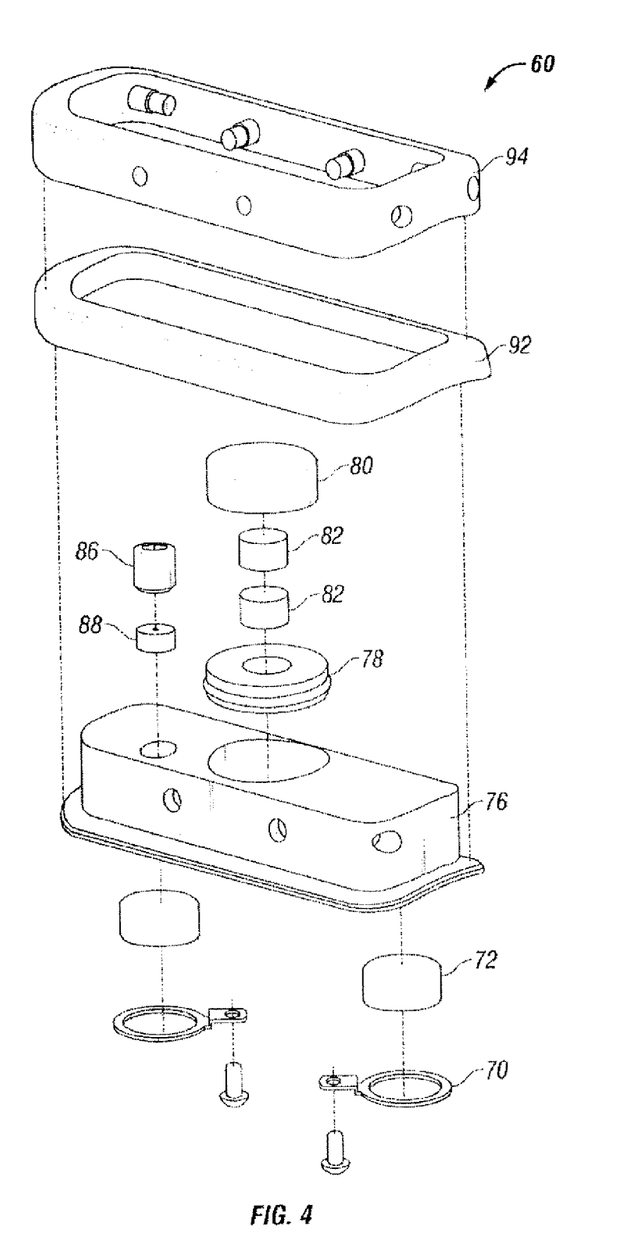
FIG. 4 is an exploded view of one of the pistons shown in FIG. 2.

Each of the actuators 60 is adapted for applying a pivoting force to an inner surface of the tubular sleeve 58 when activated. FIGS. 3-4 illustrate the components of a piston actuator 60, including a piston base 76 having bushings 72 secured within lower recesses (not shown). In the embodiment shown, the bushings 72 are secured into the piston base 76 by respective retaining rings 70. In other embodiments, the bushings 72 can be secured by alternate means such as being pressed into the piston base 76.

Each piston actuator 60 further includes a bearing assembly, including lower plate 78, upper plate 80 and magnets 82. The magnets 82 are an exemplary method of ensuring continuous contact between the upper plate 80 and the lower plate 78. Alternatively, the continuous contact can be maintained by other means such as rubber sleeves, springs and the like. The upper plate 80 is designed to withstand pivotal and sliding engagement with wear ring 84 carried on an inner surface of the tubular sleeve 58 (see FIG. 2) adjacent a first strike ring 66 (described below). A rubber seal 92 is secured about the piston base 76 with a clamp ring 943. The rubber seal 92 and bushings 72 cooperate to seal the piston 60 against loss of the force-transmitting drilling fluid while permitting sliding reciprocation of the piston base 76 within its respective adaptor sleeve 62. The choke 88 and associated bushing 86 ensure constant renewal of drilling fluid in the piston chamber, thereby reducing the intrusion of debris.

In another embodiment, each of the actuators is electrically actuated (e.g., electromechanical, electromagnetic), in which case the force-transmitting medium is electricity. The gate of this embodiment is an electrical switch. Actuation, in this case, can be controlled through use of a digital control system.

Returning to FIG. 2, the drive coupling 50 of the RSS 20 further includes a first strike ring 66 carried (at least partially) on an inner surface of the tubular sleeve 58 disposed about a portion of the first section 52 to limit the degree of pivoting between the tubular sleeve 58 and the first section 52. A second strike ring 68 is also carried on an outer surface of (at least part of) the portion of the first section 52 disposed within the tubular sleeve 58, such that the second strike ring 68 complements the first strike 66 ring in limiting the degree of pivoting between the tubular sleeve 58 and the first section 52.

A gate is provided for delivering a force-transmitting medium, which is a drilling fluid in the embodiment of FIGS. 2-6, to activate the piston actuators 60 when the actuators are moved through a wellbore-referenced window by rotation of the drive coupling's first section 52 with the drill string 12. The wellbore-referenced window is greater than 90° in a four-actuator embodiment such that at least two of the actuators 60 are activated within the window when the gate delivers the force-transmitting medium. Accordingly, the second section 54 is controllably oriented relative to the first section 52. Similarly, in a three-actuator embodiment (see FIG. 9, described further below), the wellbore-referenced window is greater than 120° such that at least two of the actuators 960 are activated within the window when the gate delivers the force-transmitting medium.

In the embodiment depicted in FIGS. 2-6, the gate is a rotary valve (depicted schematically in FIG. 6B), and includes a rotating element that rotates with the drill string 12, and a position control element 106. The rotating element is defined by a portion of the first section 52 that includes four mud ports 90 formed therein for delivering drilling fluid to the respective four piston actuators 60. The position control element 106 is shaped for closing the ports 90 with a "window" of approximately 180° for opening the ports. The window opening is preferably between about 90° and about 270°, and in the particular case of a 180° opening at least two adjacent ports 90, which rotate with the first section 52, and will continuously be opened so as to communicate drilling fluid to their respective pistons 60.

Figure 6A:
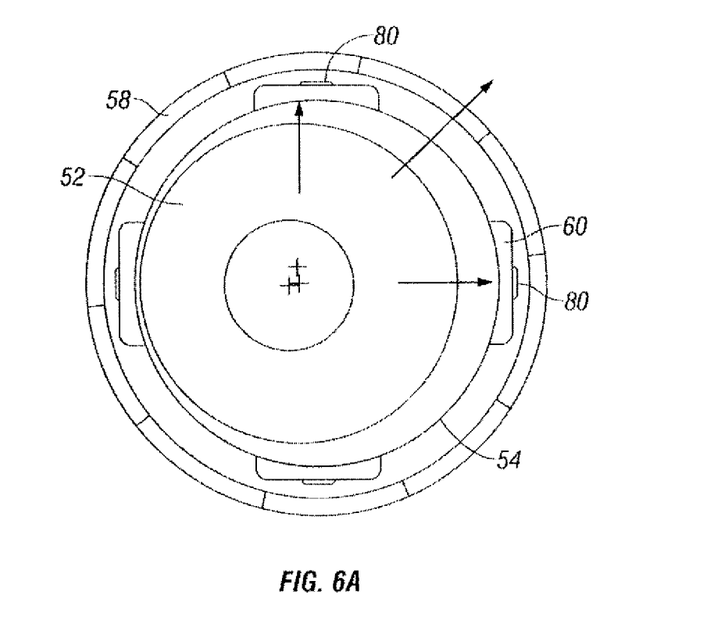
FIG. 6A is a cross-sectional view taken along section line 6A-6A in FIG. 2.
Figure 6B:
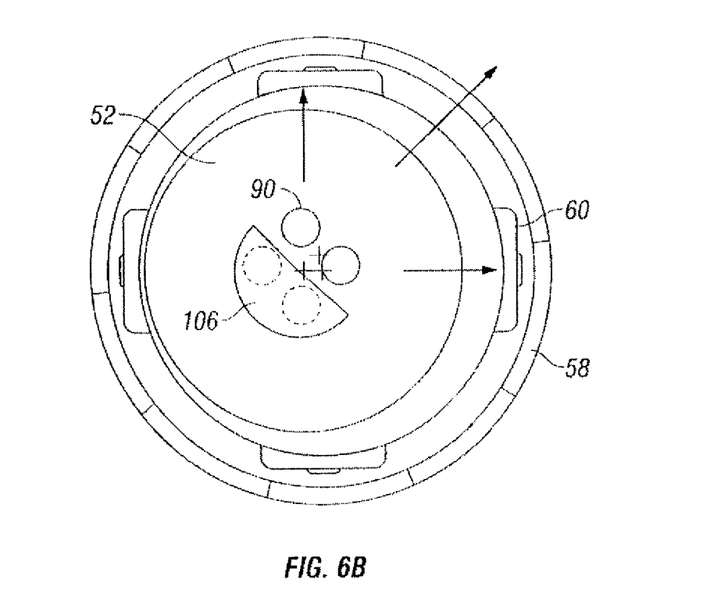
FIG. 6B is a schematic representation of the rotating and position control valve elements employed to activate the piston actuators in the embodiment of FIG. 2.

A control unit, such as that employed in Schlumberger's PowerDrive Xtra series of RSS tools, is provided in the control section 22 (or, alternatively, the steering section 24) for maintaining the position control element 106 in a substantially stationary position relative to the wellbore 4, whereby the window defined by the position control element 106 is wellbore-referenced. The control unit determines the proper azimuth at which to maintain the position control element 106 and the duration required to achieve the planned wellbore inclination.

Steering control may be enhanced by equipping the flexible joint 56 with sensors adapted for measuring the azimuth and inclination of the second section 52. Such sensors will be nearer to the drill bit 28 than the control unit, and can therefore be used to approximate the current dogleg of the wellbore before the sensors in the control unit pass the newly-drilled wellbore regions.

Figure 7:
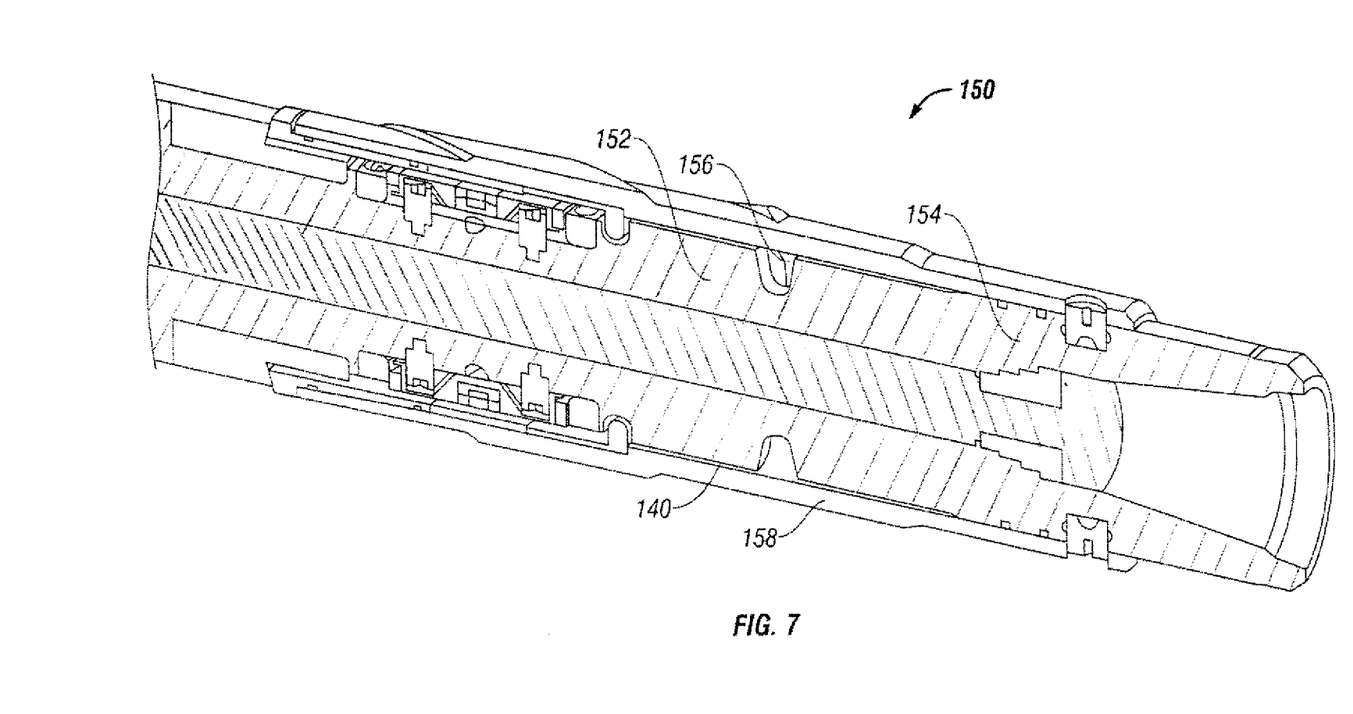
FIG. 7 is a sectional view of an alternative embodiment of a steering section of a RSS.

FIG. 7 shows another embodiment of the lower steering section 24b, wherein the first section 152 of the drive coupling 150 is a first substantially rigid section of a tubular body 140 and the second section 154 is a second substantially rigid section of the tubular body 140. The tubular body 140 further includes a substantially flexible section 156 that defines the flexible joint. The drive coupling further includes an outer tubular sleeve 158, that is similar to the tubular sleeve 58 described above. The drive coupling 150 is otherwise similar to the drive coupling 50 described above.

the present invention in its various embodiments thus enables one or more methods for steering a drill string 12 while the drill string is rotating. With particular reference to FIGS. 2-6, a force-transmitting medium, such as drilling fluid, is directed through ports 90 in the portion of the first section 52 disposed within the tubular sleeve 58 to apply a pivoting force to inner surface portions of the tubular sleeve 58 moving through a wellbore-referenced window. As a result, the second section 54 is controllably oriented relative to the first section 52. In other words, the bit axis 34 is controllably oriented relative to the axis 38 of the last drill collar 16 to achieve a desired drilling direction.

When the position control element 106 is designed such that the wellbore-referenced window is about 180°, the application of a pivoting force to inner surface portions of the tubular sleeve 58 vis ports 90 continuously activates two of the adjacent and orthogonal piston actuators 60. The control system holds the control element 106 in an appropriate roll-stabilized position relative to the wellbore, so as to achieve the desired wellbore azimuth. As the first section 52, including the stator portion, rotates with the drill string 12 at drill string speed, at least a portion of two adjacent stator ports 90 are open at all times to permit drilling fluid to flow through the opened ports and actuate their respective piston actuators 60 in sequence. The resultant side force exerted on the sleeve 58 is the sum of the individual force vectors, as indicated in FIGS. 6A-6B.

The piston actuators 60 have a sliding interface with the sleeve 58, provided by the above-described piston bearing assembly and the sleeve's wear ring 84, to allow for the relative movement of the sleeve 58 relative to the first section 52 (i.e., the main tool body). Since the actuators 60 must provide the steering-inducing side forces, as well as compensate for the frictional forces on the drill bit 28, the lower steering section 24b is preferably controlled by having two orthogonal actuators 60 operating at any one time.

The angular offset range of the sleeve 58 is limited by the strike rings 66 and 68, which together provide a third point of contact beside the two actuators. The strike ring limits the maximum dogleg rate of the drive coupling 50 and can be selected to meet the well plan requirements.

When it's necessary to drill straight ahead, the position control element 106 is permitted to rotate at slow speeds so as to vary the direction of the resulting steering force continuously. Since it requires time for the drill bit 28 to achieve the full angular offset imposed by the drive coupling 50, a neutral steering mode is achieved. In this neutral mode, the offset is small, or nonexistent, and the frictional forces and wear rates on the RSS 20 are reduced.

Those skilled in the art will appreciate the present invention provides a point-the-bit steering system having a simple control architecture, making the system easier to maintain and reducing its cost. Steering accuracy is preserved in the system by using three or more evenly-spaced, orthogonal actuators to keep the size of the steering window relatively small. Rather then attempting to hold the drill bit axis in a fixed orientation and thereby sacrificing steering force and angular offset to achieve accurate control, the drill bit axis is controlled by actuators (e.g., two orthogonal actuators) pointing the drill bit not in a single direction but into a wellbore-referenced window (e.g., an approximately 90° wide window) between the actuation force vectors. Once the resultant force vector has traveled through the steering window, the leading actuator (the one leaving the window) is switched off and the next actuator (the one entering the window) is activated. The resultant force vector is thus continuously sweeping through the same steering window. The result is a single, steered drilling direction. The timing of the actuators 60 can also be adjusted, e.g., by adjusting the rotary valve orientation.

Figure 8:
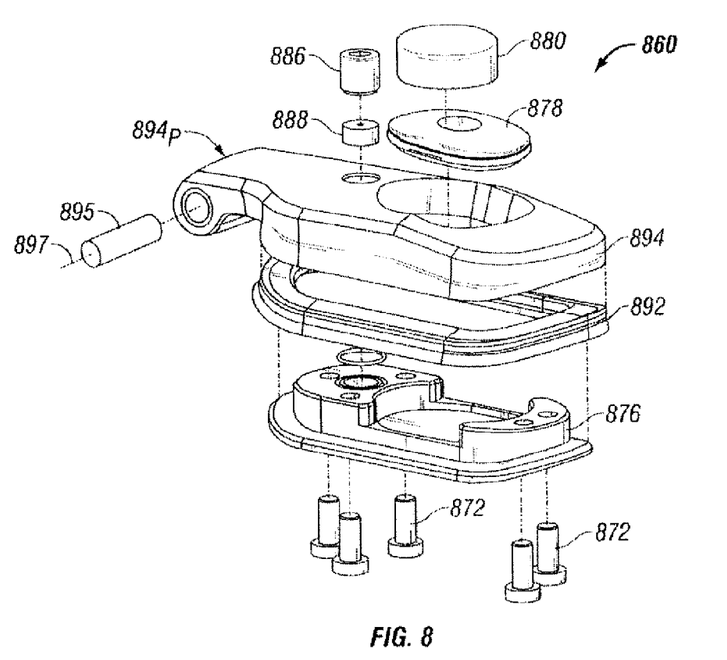
FIG. 8 is an exploded view of an alternative piston, in comparison to that shown in FIG. 4.

It will be understood from the foregoing description that various modifications and changes may be made in the preferred and alternative embodiments of the present invention without departing from its true spirit. Thus, e.g., FIG. 8 illustrates the components of an alternative piston actuator 860, including a piston base 876 having bushings 872 secured within lower recesses (not shown) of the piston base 876 by being pressed therein. Each piston actuator 860 further includes a bearing assembly, including lower plate 878, upper plate 880, and means (not shown) such as rubber sleeves, springs and the like for ensuring continuous contact between the upper plate 880 and the lower plate 878. The upper plate 880 is designed to withstand pivotal and sliding engagement with wear ring 84 carried on an inner surface of the tubular sleeve 58 (see FIG. 2) adjacent a first strike ring 66 (described above). A rubber seal 892 is secured about the piston base 876 with a cap portion 894. The rubber seal 892 and bushings 872 cooperate to seal the piston 860 against loss of the force-transmitting drilling fluid while permitting pivotal reciprocation of the piston base 876 within its respective adaptor sleeve (similar to adaptor sleeve 62 described above). The choke 888 and associated bushing 886 ensure constant renewal of drilling fluid in the piston chamber, thereby reducing the intrusion of debris. The cap portion 894 is equipped with a pivot arm 894p which is rotatably secured to an alternative adaptor sleeve (not shown) by way of a pin 895. The pivot arm 894p and pin 895 thus permit the piston 860 to pivot about axis 897, resulting in a reciprocating movement of the piston with respect to the adaptor sleeve.

Figure 9:
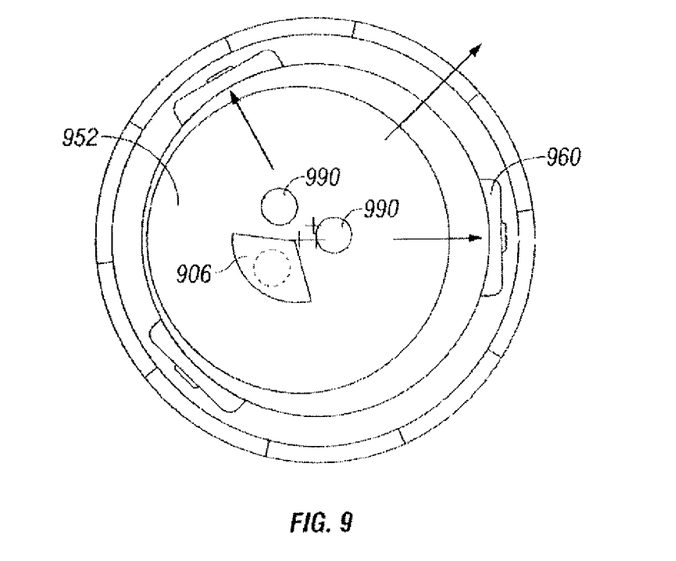
FIG. 9 is a schematic representation of the rotating and position control valve elements employed to activate the piston actuators in an alternative embodiment, in comparison to that shown in FIG. 6B.

FIG. 9 depicts a further alternative embodiment employing three piston actuators 960, in contrast to the four piston actuators of FIG. 6B. The gate of this embodiment is a rotary valve, and includes a rotating element that rotates with the drill string 12, and a position control element 906. The rotating element is defined by a portion of the first section 952 that includes three mud ports 990 formed therein for delivering drilling fluid to the respective three piston actuators 960. The position control element 906 is shaped for closing one of the ports 990 with a window of approximately 240° for opening the other two ports. Accordingly, at least two adjacent ports 990, which rotate with the first section 952, will continuously be opened so as to communicate drilling fluid to their respective pistons 960.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A rotary steerable system, comprising:
a drive coupling having a first section adapted for connection within a drill string; a second section adapted for supporting a drill bit; and a flexible joint connecting the first section to the second section for transmitting drilling loads therebetween as the first section is rotated by the drill string and for permitting pivoting of the second section relative to the first section;
a tubular sleeve disposed about the flexible joint and at least portions of the first section and the second section, the tubular sleeve being connected to the second section for movement therewith and being sized to permit pivoting movement of the tubular sleeve relative to the portion of the first section disposed therein;
at least three actuators carried by the portion of the first section disposed within the tubular sleeve, each of the actuators being adapted for applying a pivoting force to an inner surface of the tubular sleeve when activated, the actuators being spaced substantially evenly apart; and
a gate for delivering a force-transmitting medium to activate the actuators when the actuators are moved through a wellbore-referenced window by rotation of the first section with the drill string, the window sized such that at least two of the actuators are activated within the window at all times when the gate delivers the force-transmitting medium, whereby the second section is controllably oriented relative to the first section,
wherein the second section rotates at the same speed as the first section and the drill string.

2. The rotary steerable system of claim 1, further comprising a first strike ring carried on an inner surface of the tubular sleeve disposed about the portion of the first section to limit the degree of pivoting between the tubular sleeve and the first section.

3. The rotary steerable system of claim 2, further comprising a second strike ring carried on an outer surface of the portion of the first section disposed within the tubular sleeve, the second strike ring complementing the first strike ring to limit the degree of pivoting between the tubular sleeve and the first section.

4. The rotary steerable system of claim 1, wherein each of the actuators is a piston, and the force-transmitting medium is drilling fluid.

5. The rotary steerable system of claim 4, wherein the gate is a rotary valve.

6. The rotary steerable system of claim 5, wherein the rotary valve includes a rotating element and a position control element.

7. The rotary steerable system of claim 6, wherein the rotating element includes three or more ports formed in the first section for delivering drilling fluid to the respective three or more pistons.

8. The rotary steerable system of claim 7, wherein the position control element includes a valve rotor shaped to define a body for closing the ports and a window for opening the ports, the window having an opening between about 90° and about 270° such that during rotation of the rotating element, at least two of the ports can communicate drilling fluid to their respective pistons.

9. The rotary steerable system of claim 8, wherein the window has an opening of about 180°.

10. The rotary steerable system of claim 8, further comprising a control unit for maintaining the valve rotor in a substantially stationary position relative to the wellbore, whereby the window is wellbore-referenced.

11. The rotary steerable system of claim 4, wherein the gate is solenoid actuated.

12. The rotary steerable system of claim 1, wherein each of the actuators is electrically actuated, and the force-transmitting medium is electricity.

13. The rotary steerable system of claim 12, wherein each of the actuators is an electromechanical actuator.

14. The rotary steerable system of claim 12, wherein each of the actuators is an electromagnetic actuator.

15. The rotary steerable system of claim 12, wherein the gate is an electrical switch.

16. The rotary steerable system of claim 1, wherein the first section is a tubular body.

17. The rotary steerable system of claim 1, wherein the second section is a bit shaft.

18. The rotary steerable system of claim 1, wherein the flexible joint is a universal joint.

19. The rotary steerable system of claim 18, wherein the universal joint is a Hooke's joint.

20. The rotary steerable system of claim 1, wherein the first section is a first substantially rigid section of a tubular body, the second section is a second substantially rigid section of the tubular body, and the joint is a substantially flexible section of the tubular body.

21. A method for steering a drill string while the drill string is rotating, the drill string having a drive coupling including a first section connected to a second section via a flexible joint, and a tubular sleeve disposed about the flexible joint and at least portions of the first section and the second section, the tubular sleeve being connected to the second section for movement therewith and being sized to permit pivoting movement of the tubular sleeve relative to the portion of the first section disposed therein, the method comprising the steps of:
rotating the drill string within the wellbore;
directing a force-transmitting medium through a wellbore referenced window and at least two ports at all times while the drill string is rotating, the at least two ports being in the portion of the first section disposed within the tubular sleeve to enable application of at least two non-parallel pivoting forces to inner surface portions of the tubular sleeve to create a resultant force vector, whereby the second section is controllably oriented relative to the first section according to the resultant force vector, wherein the first and second sections rotate at the same speed; and the first section is connected to the second section to ensure rotation at the same speed.

22. The method of claim 21, wherein the window has an opening of about 180°.

23. The method of claim 21, wherein the force-transmitting medium is drilling fluid.

24. The method of claim 23, wherein the drilling fluid activates three or more pistons carried by the portion of the first section disposed within the tubular sleeve, the pistons being evenly spaced apart about the portion of the first section and each applying a pivoting force to the tubular sleeve when activated.

25. The method of claim 24, wherein the drilling fluid is delivered to the three or more pistons via three or more respective ports in the first section.

26. The method of claim 25, wherein the delivery of drilling fluid is controlled by a rotary valve.

27. The method of claim 26, wherein the rotary valve includes a valve rotor whose orientation is controlled relative to the wellbore.

28. The method of claim 27, wherein the wellbore-referenced window is about 180°.

29. The method of claim 28, wherein the application of a pivoting force to inner surface portions of the tubular sleeve moving through a wellbore-referenced window of about 180° produces a resultant pivoting force directed within a smaller wellbore-referenced window of about 90°.

30. The method of claim 21, wherein the first section is a tubular body.

31. The method of claim 21, wherein the second section is a bit shaft.

32. The method of claim 21, wherein the flexible joint is a universal joint.

33. The method of claim 21, wherein the first section is a first substantially rigid section of a tubular body, the second section is a second substantially rigid section of the tubular body, and the flexible joint is a substantially flexible section of the tubular body.

34. The method of claim 21, wherein the force-transmitting medium is electricity.

35. The method of claim 34, wherein the electricity activates three or more electrical devices carried by the portion of the first section disposed within the tubular sleeve, the electrical devices being evenly spaced apart about the portion of the first section and each applying a pivoting force to the tubular sleeve when activated.

* * * * *